(12) United States Patent
Morris-Yates

(10) Patent No.: US 7,111,239 B2
(45) Date of Patent: Sep. 19, 2006

(54) METHOD FOR ACTIVE FEEDBACK

(75) Inventor: Timothy Mark Morris-Yates, Willoughby (AU)

(73) Assignee: Canon Kabushiki Kaisha, Tokyo (JP)

(*) Notice: Subject to any disclaimer, the term of this patent is extended or adjusted under 35 U.S.C. 154(b) by 491 days.

(21) Appl. No.: 09/867,631

(22) Filed: May 31, 2001

(65) Prior Publication Data

US 2002/0054144 A1    May 9, 2002

(30) Foreign Application Priority Data

May 31, 2000    (AU)    .................. PQ7865

(51) Int. Cl.
*G06F 3/00*    (2006.01)

(52) U.S. Cl. .................. 715/709; 715/711; 715/705

(58) Field of Classification Search .......... 345/764, 345/771, 772, 808, 840, 833, 861, 779, 826, 345/856, 862, 765, 172, 857, 858, 859, 860; 715/705–711
See application file for complete search history.

(56) References Cited

U.S. PATENT DOCUMENTS

| | | | | |
|---|---|---|---|---|
| 5,235,679 A | * | 8/1993 | Yoshizawa et al. | 715/709 |
| 5,317,688 A | * | 5/1994 | Watson et al. | 715/707 |
| 5,377,319 A | * | 12/1994 | Kitahara et al. | 715/707 |
| 5,467,441 A | * | 11/1995 | Stone et al. | 345/619 |
| 5,555,369 A | * | 9/1996 | Menendez et al. | 715/762 |
| 5,602,982 A | * | 2/1997 | Judd et al. | 715/709 |
| 5,640,522 A | * | 6/1997 | Warrin | 715/732 |
| 5,721,853 A | | 2/1998 | Smith | 395/353 |
| 5,805,167 A | * | 9/1998 | van Cruyningen | 345/808 |
| 5,870,088 A | | 2/1999 | Washington et al. | 345/326 |
| 5,903,905 A | * | 5/1999 | Andersen et al. | 715/526 |
| 5,923,325 A | * | 7/1999 | Barber et al. | 715/711 |
| 5,977,966 A | * | 11/1999 | Bogdan | 715/800 |
| 6,020,886 A | * | 2/2000 | Jacober et al. | 345/709 |
| 6,154,209 A | * | 11/2000 | Naughton et al. | 715/764 |
| 6,326,985 B1 | * | 12/2001 | Tazoe et al. | 345/764 |
| 6,515,682 B1 | * | 2/2003 | Washington et al. | 345/762 |
| 6,542,163 B1 | * | 4/2003 | Gorbet et al. | 345/711 |

* cited by examiner

*Primary Examiner*—Kieu D. Vu
(74) *Attorney, Agent, or Firm*—Fitzpatrick, Cella, Harper & Scinto

(57) ABSTRACT

A method (1200) of providing active user feedback in a graphic user interface is disclosed. The method comprises selecting (1206) a soft control currently displayed on the graphic user interface, said soft control enabling a change to be implemented, and displaying (1208) on said graphic user interface, only during said soft control selection, and dependent upon the selecting step (1206), a pop-up preview reflecting said change.

25 Claims, 12 Drawing Sheets

METHOD FOR ACTIVE FEEDBACK

TRADEMARKS

This specification may include words which are, or are asserted to be, proprietary names or trademarks. Their inclusion does not imply that they have acquired, for legal purposes, a non-proprietary or generic significance. Furthermore, no judgement is implied concerning their legal status. In cases where it is considered that proprietary rights may attach to a word, this is indicated by $a^{propr}$ superscript, noting that this does not imply a legal judgement concerning the legal status of such words.

TECHNICAL FIELD OF THE INVENTION

The present invention relates generally to the field of user interfaces and, in particular, to graphic user interfaces. The present invention relates to a method for providing active user feedback in a graphic user interface. The invention also relates to a computer program product including a computer readable medium having recorded thereon a computer program for providing active user feedback in a graphic user interface.

BACKGROUND ART

Traditionally, when designing a user interface for graphical applications, it is generally accepted that both a working area, and areas for functional "soft" controls are provided. The term "soft control" is used throughout the specification to denote controls which are displayed on a graphic display, rather than implemented in a hardware device.

FIG. 1 shows a graphic display 100, which comprises a working area 104, and a number of control areas which are set aside for functional controls, ie. 102, 106 and 108. An exemplary control 110 is shown in the upper functional control area 102, the particular control 110 being a "scale" adjustment control in a "slider" format.

It is evident from FIG. 1 that a trade-off is required between an amount of available area allocated to the work area 104, and areas 102, 106, and 108 which are allocated to functional controls. On the one hand, the work area 104 should be as large as possible, however, it is typically desirable to have rapid access to as many functional controls, in a convenient manner, as possible.

Typically, the aforementioned trade-off involves reducing a size of the area allocated to each functional control. This is achieved, however, at the expense of clarity, simplicity and user feedback, resulting in small, cryptic controls, which often do not intuitively indicate the impact of changing the settings. An inexperienced user will, consequently, not necessarily understand what the intended use of a control is. Furthermore, there is frequently little, if any feedback as to the potential results of changing a setting of a soft control, while the control is being adjusted. This results in a "change and wait" sequence for the user, which is inconvenient and frustrating.

Some relief is provided to the user in traditional graphical user interfaces by means of "tool tips"$^{propr}$, which typically provide a brief textual description of a control, when the user positions a pointing device cursor over the control.

DISCLOSURE OF THE INVENTION

It is an object of the present invention to substantially overcome, or at least ameliorate, one or more disadvantages of existing arrangements.

According to a first aspect of the invention, there is provided a method of providing active user feedback in a graphic user interface, said method comprising steps of:

selecting a soft control currently displayed on the graphic user interface, wherein said soft control enables a change to be implemented; and displaying on said graphic user interface, only during said soft control selection and dependent upon said selecting step, a pop-up preview reflecting said change.

According to another aspect of the invention, there is provided a method of providing active user feedback in a graphic user interface, said method comprising steps of:

selecting a soft control currently displayed on the graphic user interface, wherein said soft control enables a change to be implemented; and presenting, on said graphic user interface, dependent upon and only during said selecting step, a pop-up preview comprising a present display state and a changed display state, said present and changed display states reflecting the change being implementable by the soft control.

According to another aspect of the invention, there is provided a method of providing active user feedback in a graphic user interface, said method comprising steps of:

selecting a soft control currently displayed on the graphic user interface, wherein said soft control enables a change to be made to an attribute of an object capable of being displayed on the graphical user interface; and presenting, on said graphic user interface, dependent upon and only during said selecting step, a pop-up preview comprising a present display state and a changed display state, said present and changed display states reflecting the change being implementable by the soft control.

According to another aspect of the invention, there is provided a computer readable medium for storing a program for apparatus providing active user feedback in a graphic user interface, said program comprising:

code for a selecting step for selecting a soft control currently displayed on the graphic user interface, wherein said soft control enables a change to be implemented; and code for a displaying step for displaying on said graphic user interface, only during said soft control selection and dependent upon said selecting step, a pop-up preview reflecting said change.

According to another aspect of the invention, there is provided a computer program for apparatus providing active user feedback in a graphic user interface, said program comprising:

code for selecting a soft control currently displayed on the graphic user interface, wherein said soft control enables a change to be implemented; and code for displaying on said graphic user interface, only during said soft control selection and dependent upon said selecting step, a pop-up preview reflecting said change.

According to another aspect of the invention, there is provided a computer program for apparatus providing active user feedback in a graphic user interface, said program comprising:

code for a selecting step for selecting a soft control currently displayed on the graphic user interface, wherein said soft control enables a change to be implemented; and code for a presenting step for presenting, on said graphic user interface, dependent upon and only during said selecting step, a pop-up preview comprising a present display state and a changed display state, said present and changed display states reflecting the change being implementable by the soft control.

According to another aspect of the invention, there is provided a computer program for apparatus providing active user feedback in a graphic user interface, said program comprising:

code for a selecting step for selecting a soft control currently displayed on the graphic user interface, wherein said soft control enables a change to be made to an attribute of an object capable of being displayed on the graphical user interface; and code for a presenting step for presenting, on said graphic user interface, dependent upon and only during said selecting step, a pop-up preview comprising a present display state and a changed display state, said present and changed display states reflecting the change being implementable by the soft control.

According to another aspect of the invention, there is provided an apparatus providing active user feedback in a graphic user interface, said apparatus comprising:

means for selecting a soft control currently displayed on the graphic user interface, wherein said soft control enables a change to be implemented; and means for displaying on said graphic user interface, only during said soft control selection and dependent upon said selecting step, a pop-up preview reflecting said change.

According to another aspect of the invention, there is provided an apparatus providing active user feedback in a graphic user interface, said apparatus comprising:

means for a selecting step for selecting a soft control currently displayed on the graphic user interface, wherein said soft control enables a change to be implemented; and means for a presenting step for presenting, on said graphic user interface, dependent upon and only during said selecting step, a pop-up preview comprising a present display state and a changed display state, said present and changed display states reflecting the change being implementable by the soft control.

According to another aspect of the invention, there is provided an apparatus providing active user feedback in a graphic user interface, said apparatus comprising:

means for a selecting step for selecting a soft control currently displayed on the graphic user interface, wherein said soft control enables a change to be made to an attribute of an object capable of being displayed on the graphical user interface; and means for a presenting step for presenting, on said graphic user interface, dependent upon and only during said selecting step, a pop-up preview comprising a present display state and a changed display state, said present and changed display states reflecting the change being implementable by the soft control.

BRIEF DESCRIPTION OF THE DRAWINGS

A number of preferred embodiments of the present invention will now be described with reference to the drawings, in which.

DETAILED DESCRIPTION INCLUDING BEST MODE

Figure 1:
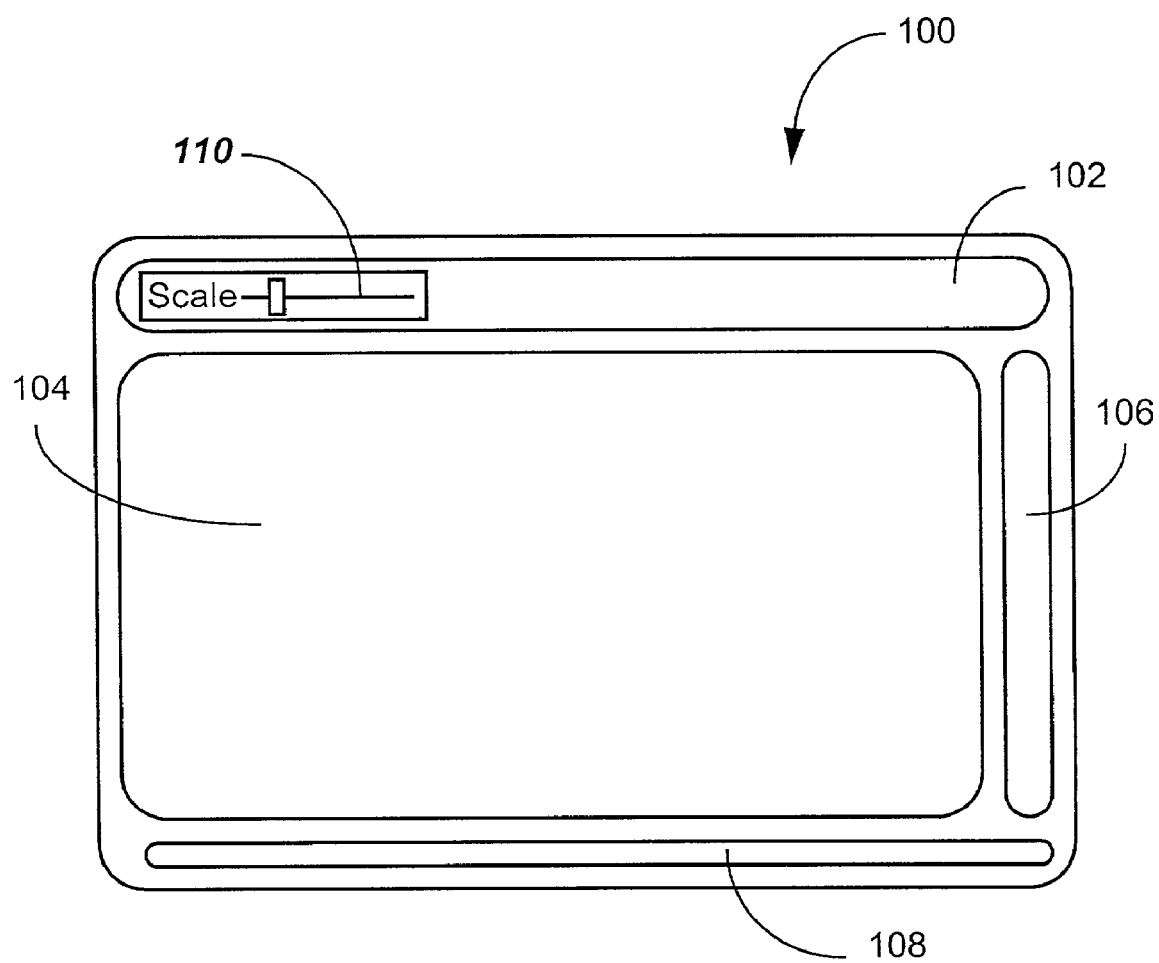
FIG. 1 depicts a graphical user interface.

Where reference is made in any one or more of the accompanying drawings to steps and/or features, which have the same reference numerals, those steps and/or features have for the purposes of this description the same function(s) or operation(s), unless the contrary intention appears.

Figure 2:
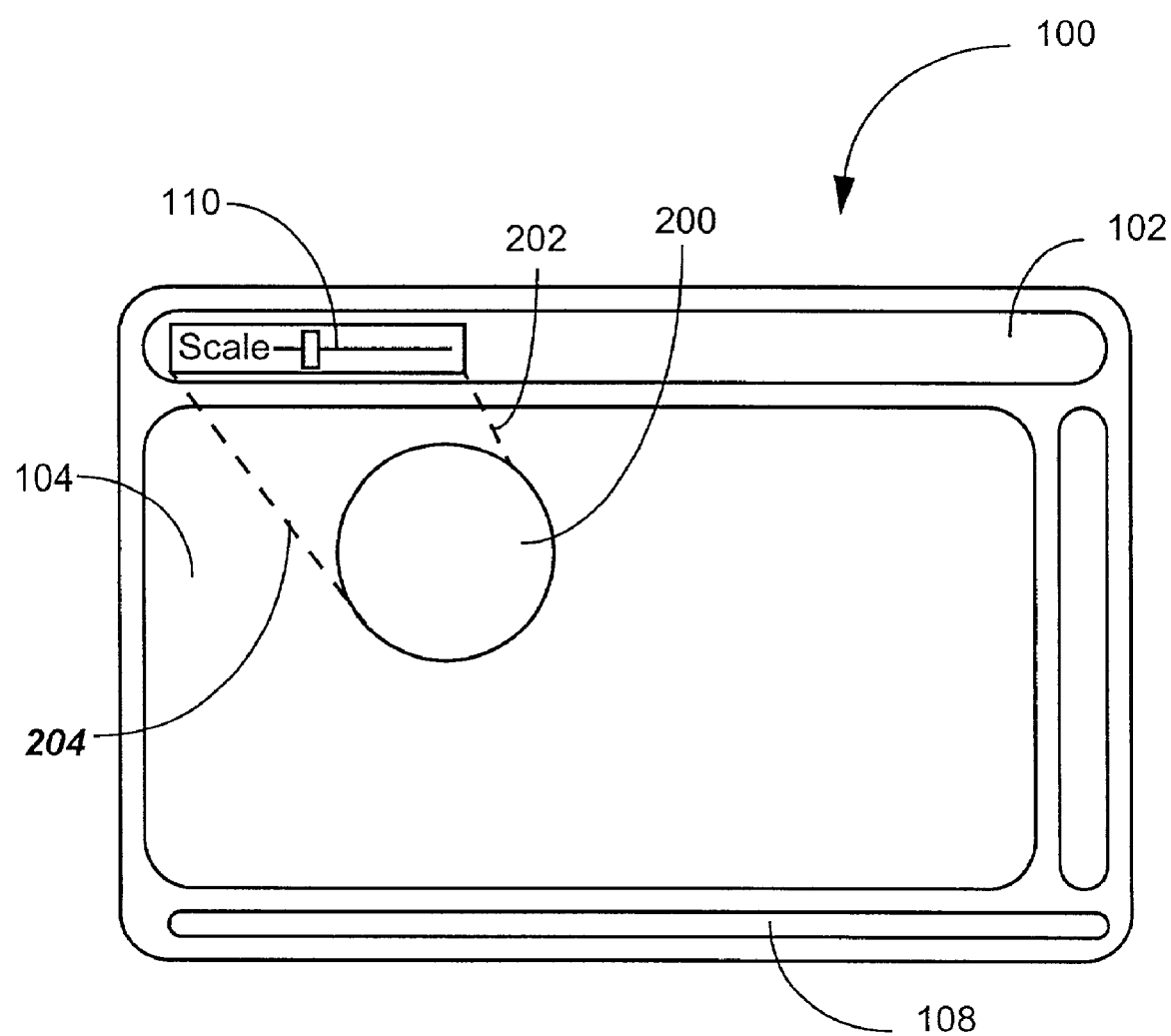
FIG. 2 shows provision of active feedback in accordance with one disclosed arrangement.

FIG. 2 shows a pop-up preview facility, which is provided in accordance with a disclosed arrangement. The previously depicted graphical display 100 has, as noted, a work display area 104, and a number of other areas, eg. 102, 108 which are set aside for functional controls, eg. 110. FIG. 2 shows a pop-up preview display 200 which is associated with the soft control 110, this association being indicated by dashed lines 202, 204. In the disclosed arrangement, when the user wishes to use the control 110, the user is provided with an expanded view showing effects which can be expected from use of the control 110. The preview 200 is presented in a convenient location on the graphical display 100, being shown in the work area 104 in the present Figure. The preview area 200 can, however, be presented in any convenient and ergonomically advantageous position on the graphical display 100, both the location, shape and size of the preview area 200 able to be designed as desired.

Figure 3:
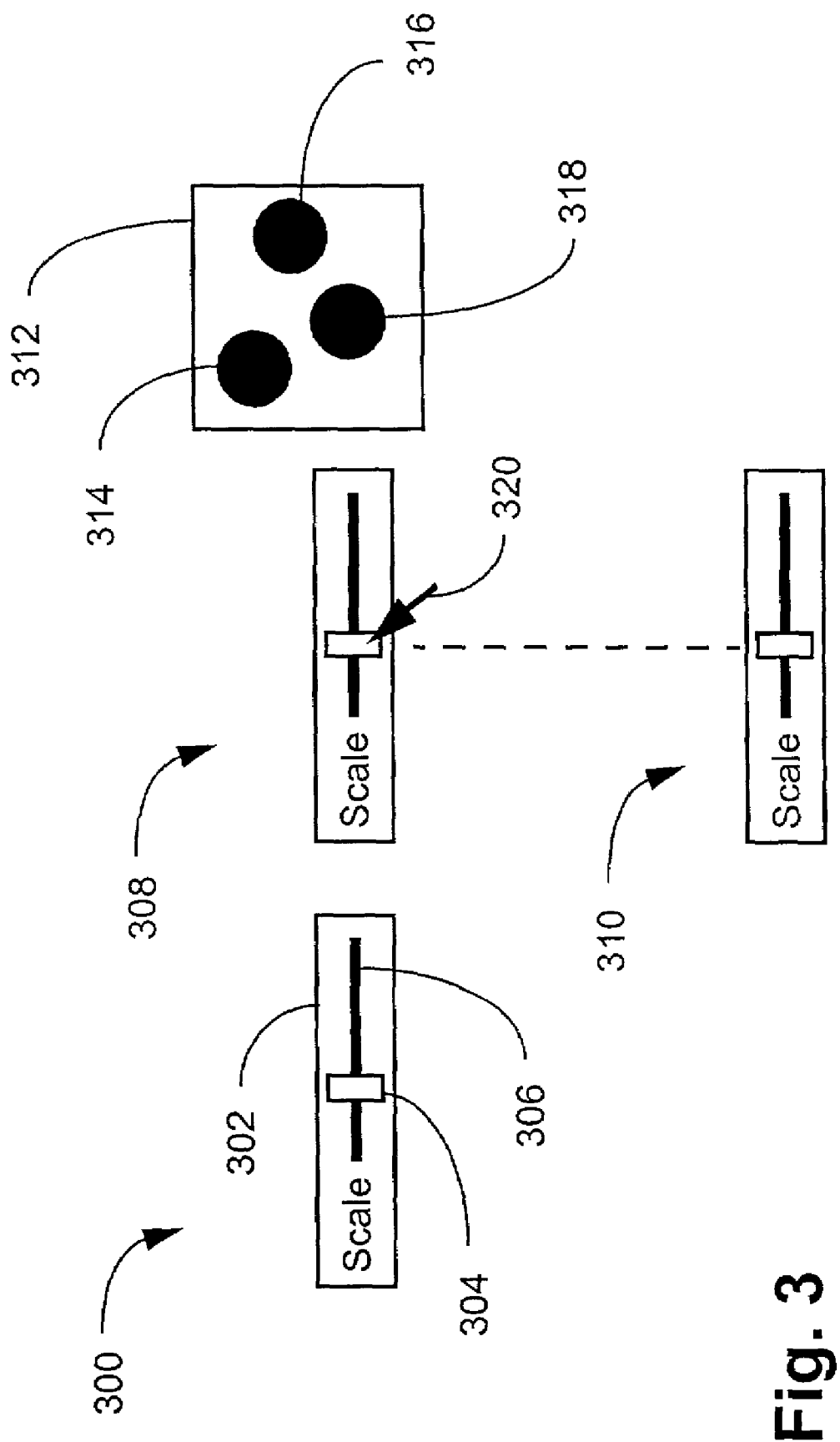
FIG. 3 shows a first view of a pop-up preview in accordance with a disclosed arrangement.

FIG. 3 shows more detail of the pop-up preview arrangement, focusing on a slider-type of soft control 302, which has a slider 304, adjustable along a slot 306. The control 302 is used, in the present example, to adjust the scale of objects displayed in the working area 104. The various arrangements described in the specification use terminology associated with a "mouse" pointing device, and use an arrow-shaped cursor which is typically associated with such devices. It is apparent, however, that this is merely exemplary, and not intended to be restrictive. The software control 302 is shown in a view 300 as it appears to the user before the user selects the control 302 in order to assess the effects of making a change thereby. When the user, in a view 308, positions a cursor 320 on the control as shown, a pop-up preview window 312 appears on the right hand side of the control as shown. Three discs 314 to 318 are displayed in the preview window 312. In the present example, the preview window 312 appears when the user both positions the cursor 320 on the control as shown in the view 308, and also activates a button on the mouse pointing device, noting that the mouse button is typically a control which is associated with the cursor. This type of action is referred to in the specification as "active designation". In the present example, the user, as shown in a view 310, decides not to use the control, and accordingly releases the mouse button, causing the preview window 310 to disappear. In summary, FIG. 3 introduces a number of user actions which will be used in various combinations in the specification.

Figure 4:
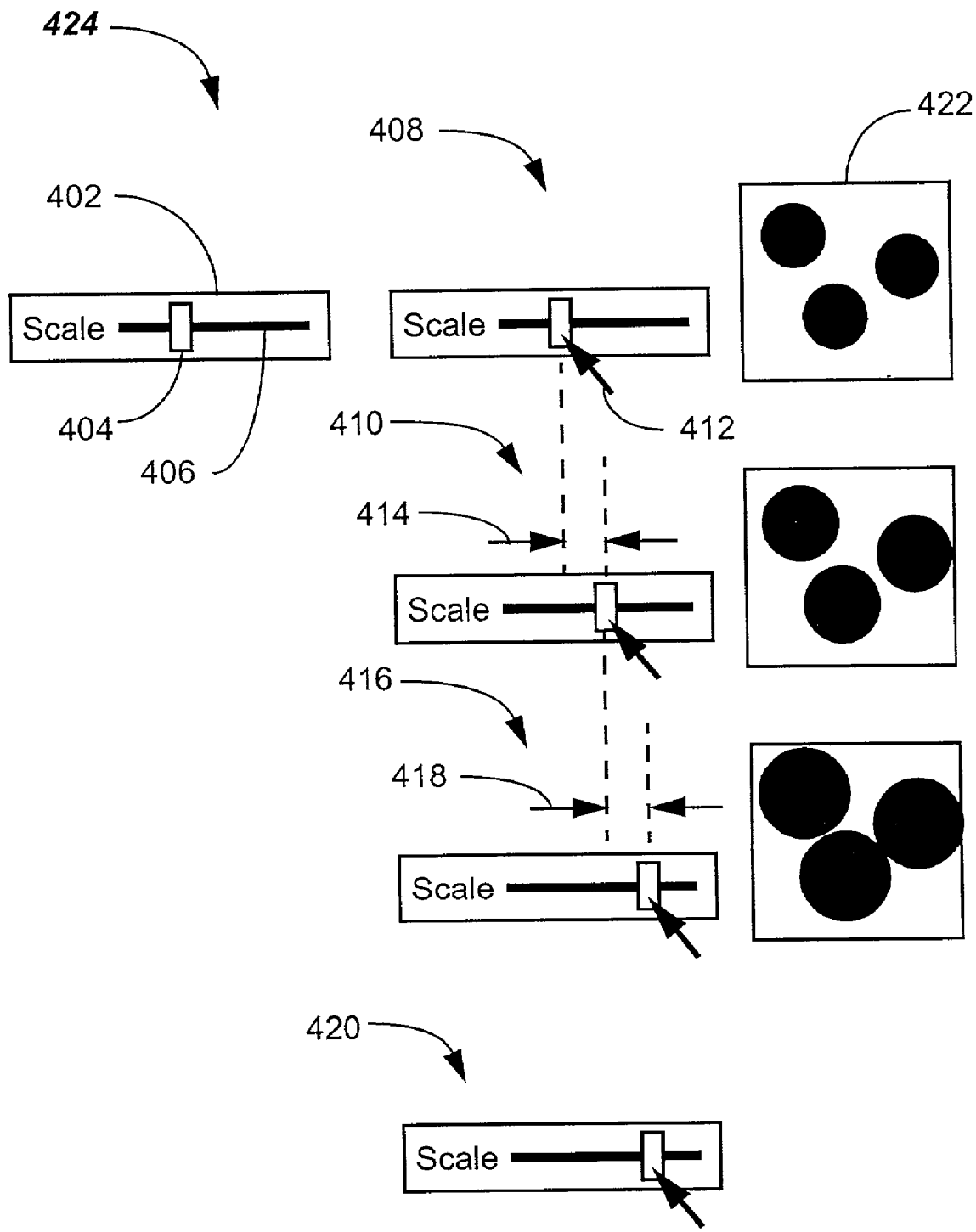
FIG. 4 shows a first type of animation used in a disclosed arrangement.

Turning to FIG. 4, a control 402 having a slider bar 404 and an adjustment slot 406 is shown, in a view 424, prior to the user making a change thereto. The user actively designates the control 402 in a view 408, by both placing a cursor 412 on the control as shown, and pressing a button on the mouse. At this point, a preview window 422 pops up as shown. In a view 410, the user is seen to have adjusted the slider 404 by an amount 414 to the right of its original position as shown in the view 424. Considering the preview window in the view 410, it is seen that the discs which were displayed in the initial preview window in the view 408 have increased in size, this increase reflecting the adjustment 414 which the user has made in the position of the slider control. In a view 416, the user makes a further adjustment 418 in the same direction as the previous adjustment 414, and consequently the size of the discs shown in the preview window are seen to have expanded yet further. When, in a view 420, the user releases the mouse button, with the slider in the position as shown by the location of the cursor in the view 416, the preview window disappears, the change in scale depicted in the preview window between the views 408 and 416 now having been effected. It is noted, that although the aforementioned description has been provided in terms of discs in the preview window, the actual corresponding scale change is to be effected in relation to a displayed objects, or objects which the user had previously selected prior to operating the control 402. Thus, for example, if the user has been working on a word processing document, and has selected an area of text which, it is desired, to increase in scale, then selection of the desired text had taken place prior to the description relating to FIG. 4. Although the prior description relates to a previous selection of text by a user, in fact such a previous selection is not necessary in order to use the preview function. Instead, for example, selection or even creation of text may be performed after the preview. The user may use the preview functionality in a number of different ways. In a first arrangement, the user can first select an object displayed on the GUI, and can then perform the preview in regard to a particular control. After having completed the preview operation, the user can then apply the control, as adjusted during the preview operation, to the selected object. In a second arrangement, the user can first select an object from the GUI. The user can then use the preview function in relation to a number of consecutive controls, adjusting each control during the course of the preview operation. Having successively previewed a series of such controls, the user can then apply the entire set of previewed controls, as adjusted, to the selected object by activating an "apply" control. In a third arrangement, the user can preview a sequence of controls as described in relation to the second arrangement, and having completed all the preview operations in regard to the various controls, can then select an object displayed on the GUI, and apply the entire set of controls, as adjusted, to that selected object. Alternately in a fourth arrangement, the user can conduct a series of preview operations for different controls as described in the previous arrangements, and can then firstly construct and display an object on the GUI, and then apply the set of controls, as adjusted which have been previewed.

The visual feedback, provided to the user by means of the aforementioned technique, allows the user to view the effects of a change in the control, in terms of symbolic "disc" representations in the preview window. The representations in the preview window are termed symbolic since they do not bear a direct relationship to the graphical object or objects which have been previously selected by the user, and upon which the user wishes to make the actual changes, ie changes of scale in the aforementioned example. This symbolic representation in the preview window is exemplary only, and not intended to be restrictive. Accordingly, the preview window can also display literal representations of the substantial, ie "actual" selected graphical object or objects upon which the user is operating, for example a selection of text, and so on. Considering, in particular, a selection of text, the user can select an amount of text displayed on the GUI, and then preview the operation of a particular control of interest, say a control relating to size. In the event that a literal preview representation of the object is being used, a copy of section of the selected text will appear in the pop-up preview window, and the effects of change on the control being previewed will be displayed in relation to the text in the preview window.

The presentation of a composite display showing a transition between a current display state, eg the discs in the view 408, and a changed display state, eg the discs in the view 416, provide the user with an intuitive understanding of changes which can be expected to arise from use of the control 402.

Figure 5:
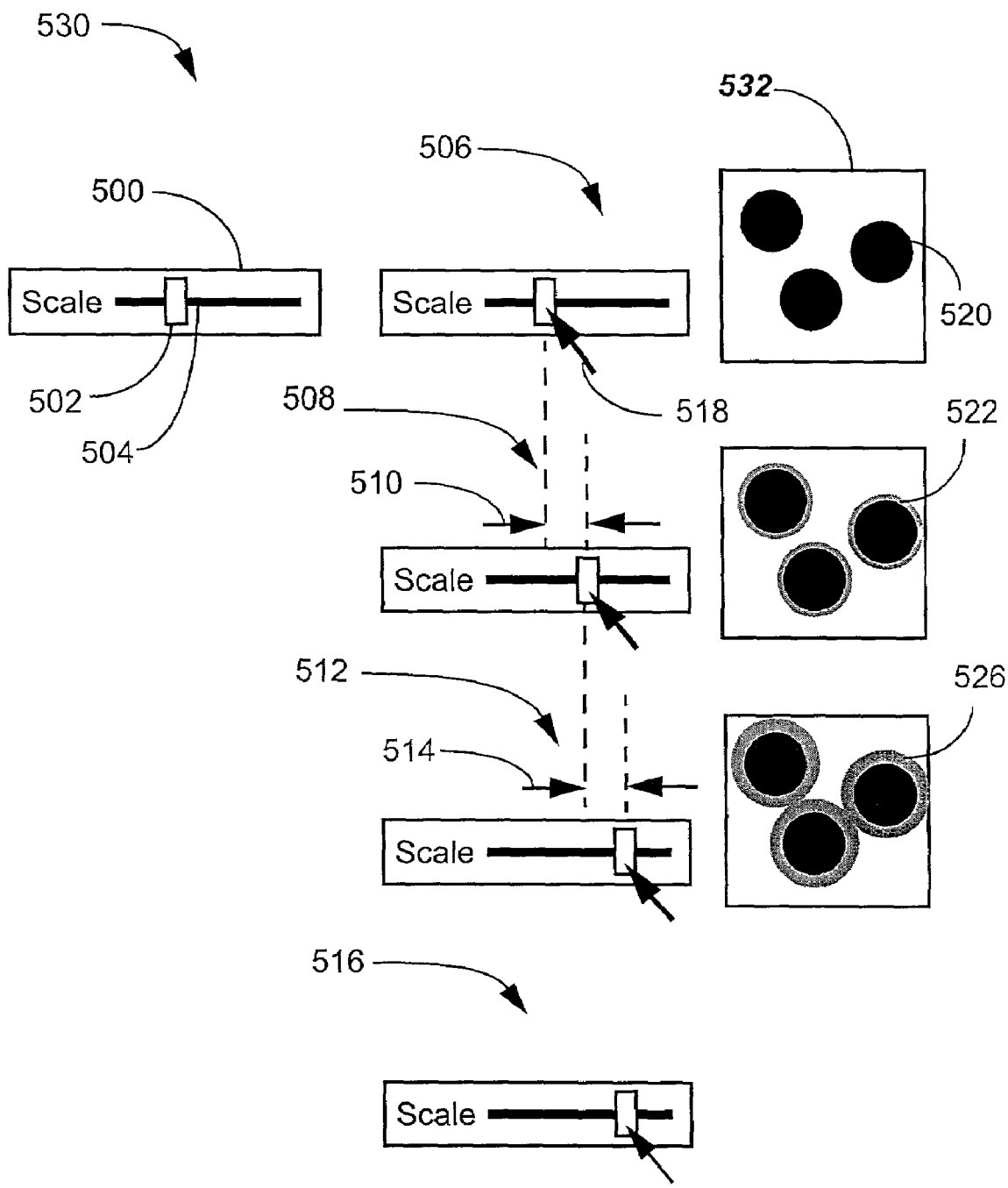
FIG. 5 shows a refinement of the animation in FIG. 4.

Turning to FIG. 5, a control 500 having a slider bar 502 and an adjustment slot 504 is shown in view 530. FIG. 5 shows a preview of a relative size of a symbolic representation as an associated control is adjusted, and also shows a present size as a baseline. Accordingly, in a view 506, a preview window 532 shows three discs, eg. 520, whose present size is consistent with a position of a slide control indicated by a position of a cursor 518. When the slider, in view 508, is moved, as depicted by a pair of arrows 510, the preview window displays both an original disc size in black 520, and an increase in size consistent with the adjustment 510, this being depicted by a grey annular ring 522. Yet a further adjustment in a view 512, depicted by an arrow pair 514, results in a further change to the preview window, which now shows an original disc size 520, and an even larger annular growth in disc size 526. When, in a view 516, the user releases the mouse button, the preview window disappears, and the size of the actual object being manipulated has been correspondingly changed from an original size corresponding to a disc size 520, to an expanded size corresponding to a disc size 526.

The concept described, therefore, is to provide temporally, a preview which makes use of additional screen real estate, this preview reflecting a change being made, at the time that the change is being considered. Therefore, while the appropriate control is being adjusted, a pop-up preview window showing the impact of the change being made is presented to the user. This additional display is only present while the control is being changed, and disappears when the control is released. The transition from "preview absent" to "preview present" can be animated, either by fading, or zooming. The preview can also, as an additional effect, be semi-transparent. The preview display also can animate the potential result of the contemplated change, further changing the display as the user changes the value of the control. In addition, the result of a change can be shown simultaneously with an original baseline setting, so that the user can more easily assess the effect of the change. This can be performed by displaying, in the preview window, a current baseline setting, shown semi-transparently in conjunction with an adjusted setting.

In a further arrangement, in order to further clarify the purpose of a control, preview animation can commence when the pointing device is positioned, for a short period without moving, over the particular control. This "training" preview can mimic slow, small changes which the user might make, thus affording the user an idea of the function of the control, without the user having to actively preselect the control. This training preview can differ visually from the actively designated changes previously described, for example by being displayed in a different colour. In this manner, the user can distinguish between training previews, and actual previews used in the course of making an actual change.

In a further arrangement, a yet further degree of clarity can be achieved, by displaying a correlated animated change which incorporates both movement in the control, along with changes in the preview of the effects.

Figure 6:
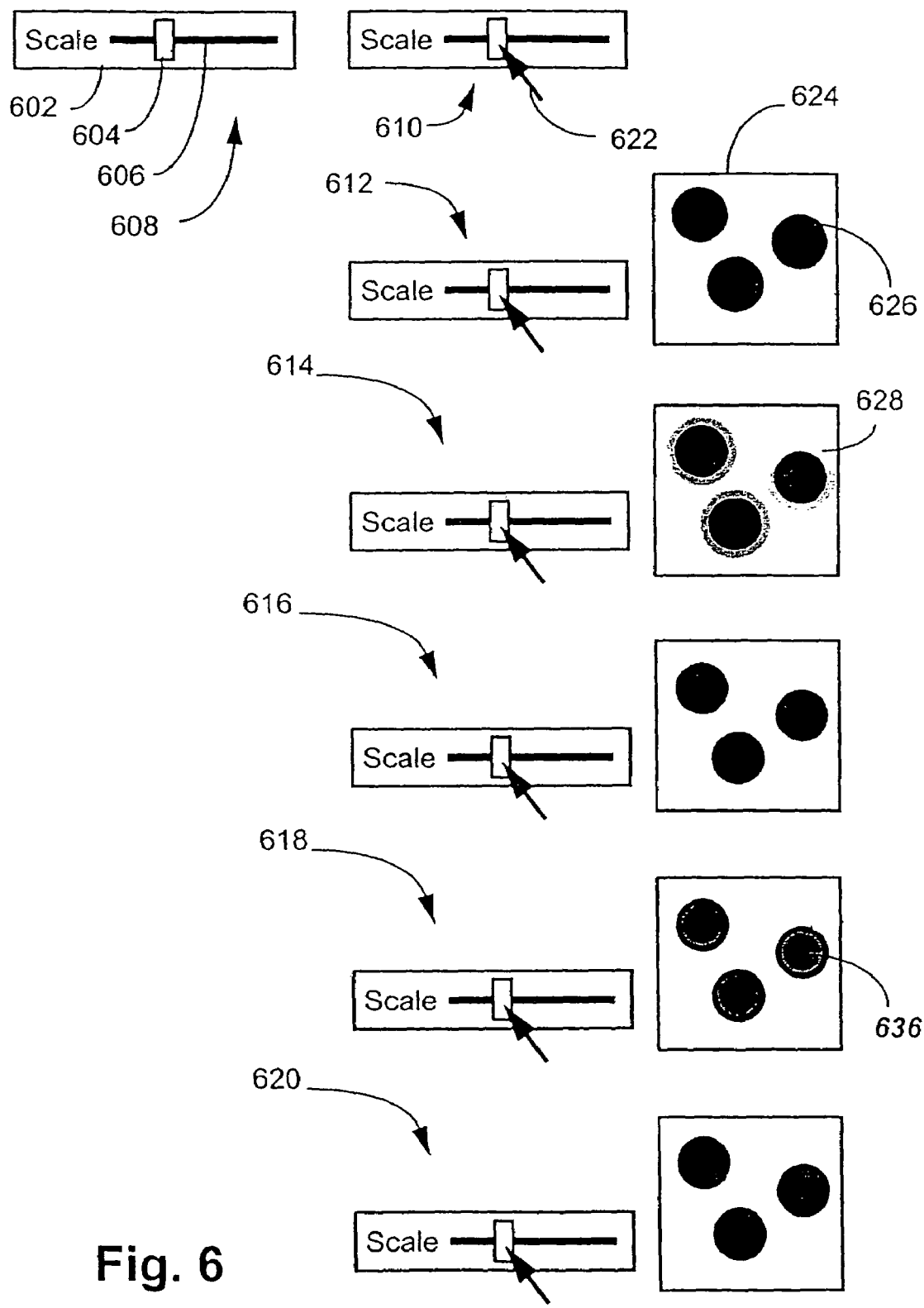
FIG. 6 shows a second type of animation applicable to a disclosed arrangement.

FIG. 6 shows a "training" preview associated with a disclosed arrangement. The training preview shows a nominal change typical of that which can be expected to arise from use of the particular control being considered. A view 608 depicts the control 602 having a slider bar 604 and an adjustment slot 606 prior to selection by the user. A view 610 shows a cursor 622 having been positioned over the slider bar, without any further action by the user, and at this point, no preview screen appears. Turning to a view 612, after some time has passed, with the cursor in the same position as in the view 610, a preview screen 624 appears, showing three discs eg. 626. The positioning of the cursor over the slider bar, if the cursor is allowed to remain there for a time period, is termed "passive designation" of the slider bar control. Thereafter, in a view 614, although the cursor has not moved relative to the prior view 612, the preview window now shows an original disc size 626 along with a small disc increase 628. In a further view 616, the cursor has again not been moved, and now the preview window again shows the original disc size 626. Thereafter, considering a view 618, the cursor still being in a same position, the preview window shows the original disc size 626, along with a diminished disc size 636. Thereafter, in a view 620, the preview window again shows the original disc size 626. When the cursor 622 is moved away from the control 602 (not shown) the preview window disappears.

Figure 7:
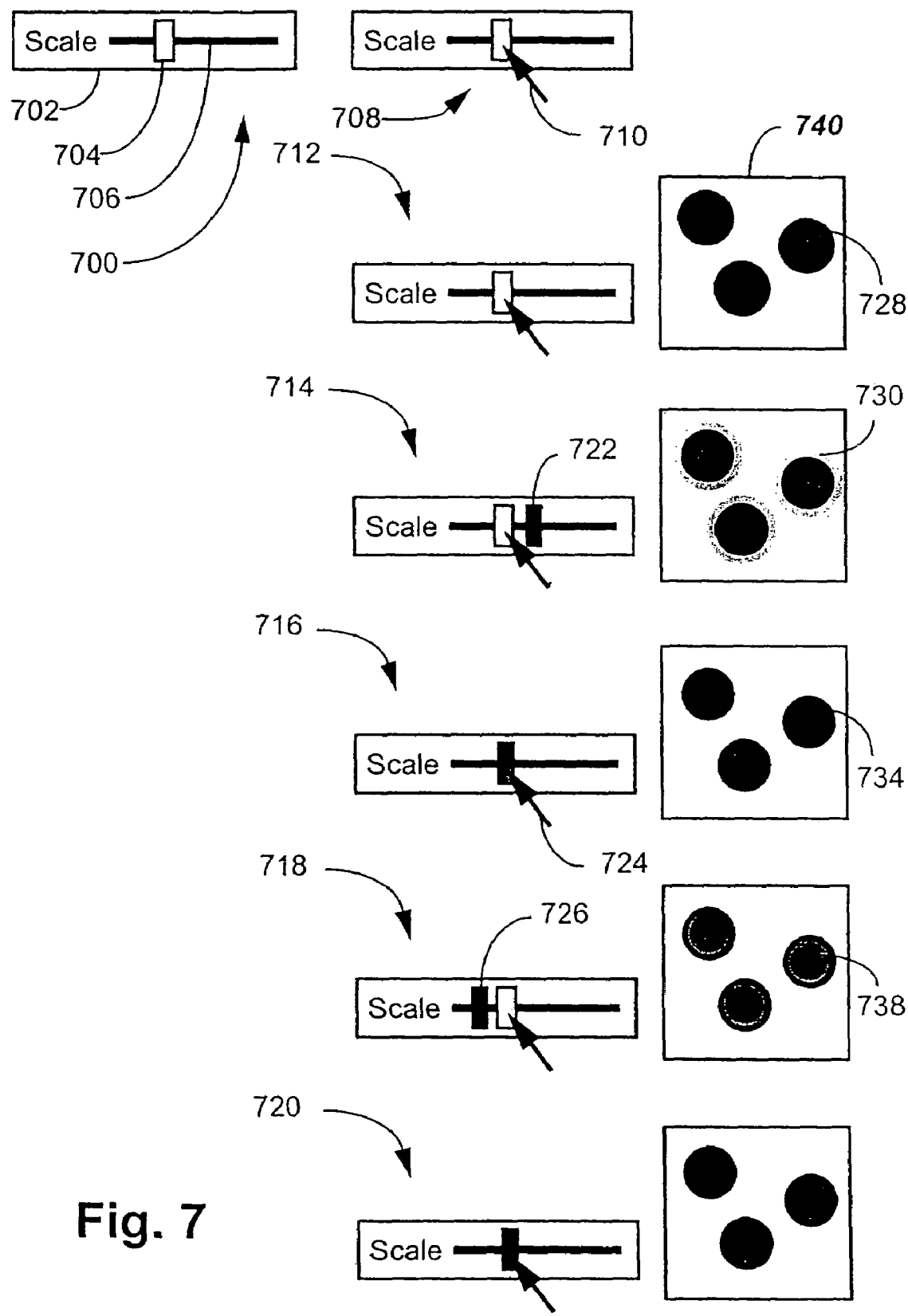
FIG. 7 shows incorporation of "control ghosting" into the animation shown in FIG. 6.

FIG. 7 shows a refinement of the aforementioned "training" arrangement. A scale control 702 is shown in a first view 700, the control comprising a slide handle 704 and a range adjustment slot 706. This view affords an indication of how the control 702 appears to the user when it is unselected. In a second view 708, the user has positioned a cursor 710 over the slide handle, and for a while, nothing further happens. Sometime later, in a view 712, a pop-up preview window 740 appears on the right hand side of the control 702, the window containing a number of discs eg. 728. Sometime later, in a view 714, the slide handle 704 has, of its own volition, moved to the right, as shown by a "ghost" handle 722. Simultaneously, the disc 728 has developed an annular growth ring 730 indicating an increase in size corresponding to the movement of the ghost handle 722 relative to an original position of the handle 704. After another time interval, in a view 716 the ghost handle 724 has now reverted to an original position of the slide handle 704, and the disc 734 has reverted to the size shown in the view 712. Still later, in a view 718 the ghost handle 726 has moved leftwards of the handle actual position, and correspondingly, the disc 728 is shown with a diminished size disc 738. Later still, in a view 720, the ghost handle has again moved to the position of the original slide handle 704, and the discs have reverted to their original size as shown in the first view 712. The present arrangement provides a correlated view to a user of a hypothetical adjustment of the control 702, showing corresponding movement of both the slide handle 704, and an indicative size of the displayed discs eg. 728. As described previously, when the user moves the cursor 710 away from the control 702, the preview window 740 disappears, and the control 702 reverts to its original aspect as shown in the view 700.

Figure 8:
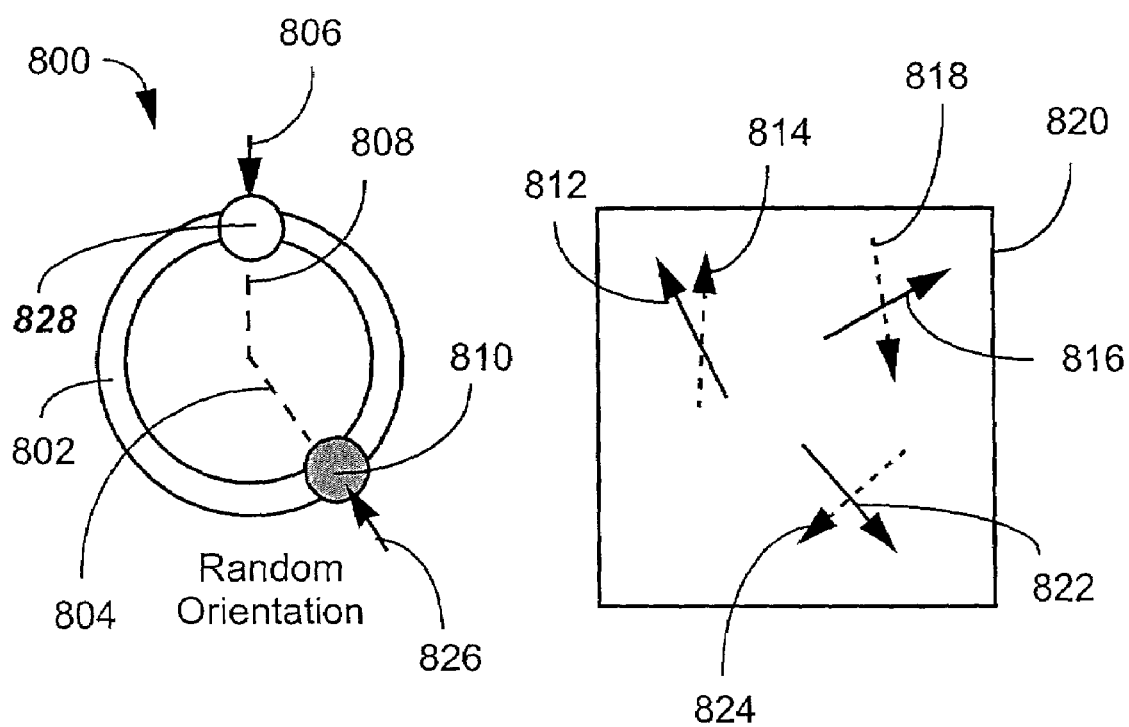
FIG. 8 depicts the application of a disclosed arrangement to a rotary control.

FIG. 8 depicts a different style of control 800, this being a "random orientation" dial-type of control. This control comprises an annular ring 802 and a "0" indication arrow 806, as well as an adjustable knob 828, which can be dragged around the annular ring 802, eg to a position 826. An angle subtended by two dashed lines 808 and 804 represents a maximum angle through which selected objects will be rotated, this rotation, however, falling randomly between 0 and that maximum angle. When the control 800 is selected by the user, by placing a cursor 826 on the control knob 828, and adjusting it to a new position 810 by holding down the mouse button and dragging the knob to the position 810, then a preview window 820 appears on the right hand side of the control 800. Furthermore, a number of arrows 812, 816 and 822 appear in the window 820, providing a symbolic representation of a number of previously selected objects in an initial orientation. A number of dashed randomly corresponding symbols 814, 818 and 824, are shown. These randomly rotated symbols have all been rotated with respect to their corresponding unrotated instances 812, 816 and 822 respectively, by random angles which are nonetheless less than a maximum angle subtended by the dashed lines 808 and 804. Although the present arrangement has been described in terms similar to those used in respect of FIG. 5, this is merely exemplary, and not intended to be restrictive.

Figure 9:
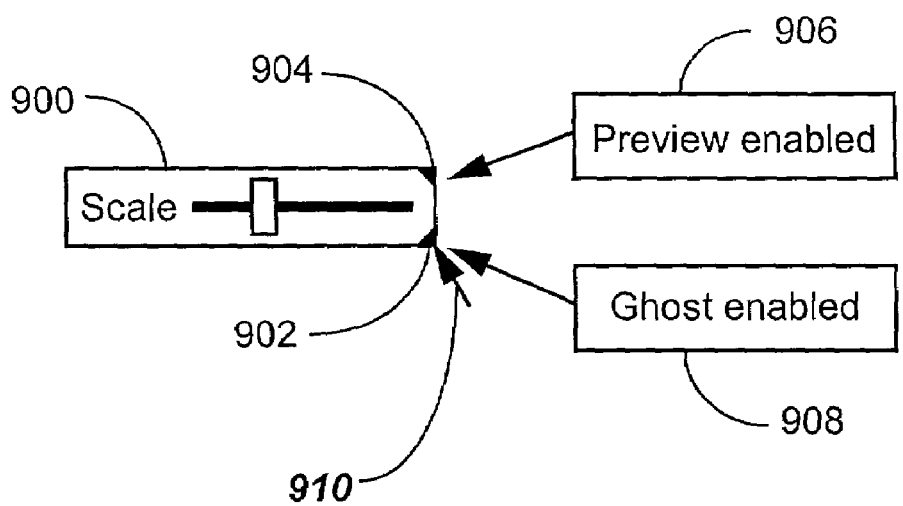
FIG. 9 illustrates an enabling/disabling control function relating to the preview functionality.

FIG. 9 shows how a user can enable, or disable, the preview and/or the ghosting functions as described in the previous figures. A scale control 900 is shown, along with shaded triangles 904 and 902 in the right hand corners of the control. The user is able to enable a ghosting feature by placing a cursor 910 on the bottom right hand corner of the control 900 and clicking on the mouse button. This action will produce a shaded corner 902 as shown, indicating that the ghosting function has been enabled, as illustrated by a box 908. The box 908 is shown for clarity in the figure, and does not actually appear on the PC display. Similarly, an upper right hand corner 904 of the control 900 can be selected, enabling, or in contrast disabling, the preview function as depicted by a box 906. FIG. 9 depicts preview enabling functionality on a per-control basis. In an alternate arrangement, a control can be provided which performs global preview enablement, thereby relieving the user from the need to enable, or disable, each control individually.

The previous description has illustrated how provision of preview displays enable a user to obtain a preview of the capabilities of a selected control. It is possible for the user to obtain a greater degree of customised control over the preview functions by the use of user preferences. User preferences address issues such as the mode of movement which is displayed in the preview window, limits which can be set to define the extent of the aforementioned movement, and other attributes which relate to either the experience of the user, or the particular task which the user is presently addressing.

In regard to the mode of movement in the preview display it will be recalled, for example, that FIG. 5 shows a preview of relative size variation of a symbolic object as an associated "size adjustment control" is adjusted. A "present" size is displayed as a baseline representation in that example. The description for FIG. 5 relates that the three discs shown, which include an exemplary disc 520, grow and shrink in the manner which illustrates the effect of the particular control 500 which has been selected for preview. The use of user preferences can define the manner in which the aforementioned discs grow and shrink, ie the "mode of movement". Accordingly, the growth and shrinkage of the discs can be a smooth oscillating transition, changing in a manner reminiscent of a sinusoidal variation, where growth and shrinkage occur in a smoothly undulating fashion. Alternately, the growth and shrinkage can be performed in a manner reminiscent of a sawtooth variation, in which the discs grow in a linear manner from a minimum to a maximum size, and then revert to the minimum size in an abrupt manner, prior to repeating the linear growth phase. The aforementioned modes of growth and shrinkage are merely exemplary, and are not, for example, limited to linear movement or any other type of movement for that matter.

The user preferences can also specify a sensitivity for the control whose function is to be previewed. This sensitivity can, for example, be related to whether a user is a novice or an expert in the use of the particular application being used. A novice would likely be most comfortable with preview movements, such as growth and shrinkage, which are of moderate scale and which exhibit smooth transitions. In contrast, an expert user might prefer larger, or alternatively smaller movements, with some other type of transitional motion such as a sawtooth.

The user preferences can also address preview attributes on a per-job basis. This is of particular benefit if, for example, a user is working on a number of different tasks, each of which is made tractable by the use of different (ie customised) user preference settings.

The user preferences can also define limits for particular preview displays. Accordingly, the user is able to define limits for growth and shrinkage, thereby constraining the size variation to fall between predefined limits.

User preferences can be applied both to continuous controls, such as the control described in relation to FIG. 5, and to "discrete" controls, such as a shape-selection control which allows the user to select either a circle, a rectangle, a square or other predefined shapes. In this type of control, a preview can cycle through the available shapes, for example, and the mode of movement selected for the cycling can be either sinusoidal, or sawtooth as previously described in relation to the continuous controls.

Since the preview function is intended to educate the user in the use of the various controls, it can often be advantageous for the user to have access to "ganged", or "coupled" controls in order to see the effect of such coupling when exercising the preview function in regard to a particular control. An application designer can, therefore, couple sets of controls for this purpose. In order to provide useful, yet simple, preview capability using coupled controls, it is noted that while several controls can be coupled together, only one of these coupled controls is the subject of the preview at any particular time. The remaining coupled controls are either maintained constant at their previous fixed settings, or alternately, may vary automatically as a function of the control being previewed. The latter situation would arise if, for example, the application designer has implemented a functional relationship between the various coupled controls.

An example of this type of preview is provided by two controls relating respectively to a base angle and a random angular variation as these attributes relate to a particular line. Accordingly, in the present example, the angular variation is a random variation lying between two limits, similar to the situation described in relation to FIG. 8.

Since the desired controls are coupled together, in the present case the base angle and the random angular variation controls, the user is able to preview the effect of varying the random angular variation control. A present control setting of the base angle control will determine the displayed base angle position of a line, while the preview function will be active only in regard to the random angular variation control. Thus, for example, referring back to FIG. 8, the present setting of the base angle control sets the present position of the line 812 (which is depicted as a solid line arrow), while the random angular variation control, which is being previewed, moves the dotted arrow representation 814 in an oscillatory manner, this being indicative of the range of the random angular variation control. Accordingly, the previewed data, which defines the preview display, is derived not only from the previewed control, but also from the other controls which have been coupled to the previewed control. In the present example, a present base angle setting of the base angle control defines the position of the base line 812, while the random angular variation control being previewed, determines the angular variation of the dotted line 814.

As noted in regard to FIG. 4, the preview function can be provided in terms of symbolic objects, for example discs in the preview window or alternatively can be performed in regard to representations of "actual" displayed objects which the user had previously selected prior to operating the preview controls which are coupled in the present instance.

Figure 10:
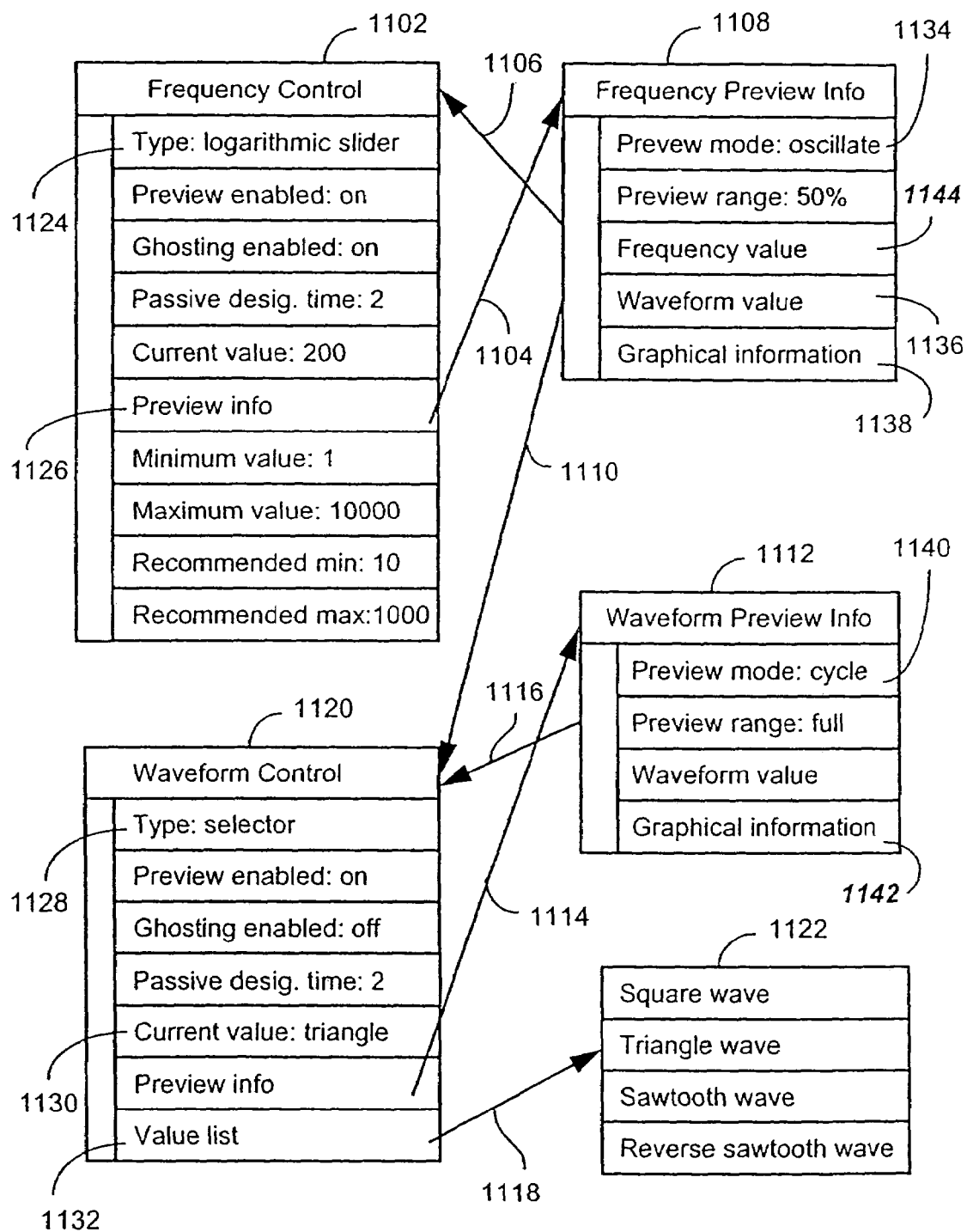
FIG. 10 shows data structures for controls in a coupled-control preview arrangement.

FIG. 10 shows an arrangement of data structures associated with two controls namely a frequency control and a waveform control. These two controls would typically be used, for example, to produce special effects to be applied to objects or text characters. Thus, for example, a square wave can be modulated onto the external border of a text character, thereby producing a wavy outline on that character. These controls are described in the context of an application using the controls in a coupled manner, and the data structures which are described show relationships between preview information and control information relating to the controls themselves.

When the frequency control (which is associated with a data structure 1102) is activated, the frequency control activates a frequency preview module which has an associated data structure 1108. The preview module creates a preview display based upon information stored both in the associated frequency preview information data structure 1108, as well as gathering current control setting information from the data structure 1102 associated with the frequency control. Furthermore, waveform control information is also gathered from the associated data structure 1120. Accordingly, the coupled preview uses information gathered from three data structures 1108, 1102 and 1120.

In the present example, a preview display of the frequency control is represented by a number of waveform peaks changing with time in an oscillatory manner as dictated by the particular waveform which has been selected. Thus, for example, a preview of the frequency control (which is associated with the data structure 1102), given the frequency preview information 1108 and the waveform control information 1120, will look like an accordion bellows expanding and contracting, since the current value 1130 of the waveform control indicates that a triangular wave is being used. If, on the other hand, the waveform control is adjusted so that the current value 1130 is a squarewave, then the preview display will have the appearance of an expanding and contracting series of squarewaves.

FIG. 10 shows the data structures 1102 and 1120 which are associated with a frequency control and a waveform control respectively. The data structure 1102 comprises a number of tabular entries descending from a first tabular entry 1124 which defines a visual form of the control provided for the frequency control. In the present case the tabular entry 1124 indicates that the visual form of the control is a logarithmic slider control. Tabular entries beneath the first tabular entry 1124 show, in descending order, that the preview function is enabled, as is the ghosting function, and that a passive designation timeout function is set to 2 seconds. The passive designation timeout represent the amount of time that a cursor must dwell over a control before passive designation is deemed to have taken place. Furthermore, the current value of the frequency control is set at a value of two hundred Hz, and a tabular entry 1126 contains a pointer, depicted by an arrow 1104, to the data structure 1108 which is associated with preview user preferences for preview of the frequency control. Tabular entries below the preview information entry 1126 indicate that a minimum value for the frequency control is "1", a maximum value is "10,000", and that recommended minimum and maximum values are "10", and "1000", respectively.

The data structure 1120 for the waveform control has tabular entries, commencing with an uppermost entry 1128 showing that the visual form of the control in this case is a selector. Further tabular entries in descending order indicate that the preview is enabled, but that the ghosting feature is disabled, and that the passive designation timeout is set to 2 seconds. A tabular entry 1130 indicates that a current waveform shape is "triangle", and succeeding tabular entries point to the preview information (the pointer being depicted by an arrow 1114 to a data structure 1112), and a value list 1132. The value list 1132 is a pointer, as depicted by an arrow 1118 to a data structure 1122, to a set of possible values for the waveform, these being depicted by tabular entries which show, in descending order, that the waveform can be a square wave, a triangle wave, a sawtooth wave, and a reverse sawtooth wave.

The data structure 1108 shows frequency preview information, derived from user preferences and possibly non-user presettable data sources, relating to the data structure 1102 for the frequency control. A first tabular entry 1134 of the data structure 1108 for the frequency preview information shows that the preview mode is an oscillate mode, and a next tabular entry shows that the preview range is 50%. The frequency value 1144 in the following tabular entry, is derived, as depicted by an arrow 1106, from the data structure 1102 for the frequency control. Similarly, the next tabular entry, ie a waveform value 1136 is derived, as indicated by an arrow 1110, from the data structure 1120 for the waveform control. The final tabular entry 1138 contains graphical information specific to generation of the preview display, such as a colour for the display.

A data structure 1112 for the waveform preview information shows, using descending tabular entries, that a preview mode 1140 is set to "cycle". Subsequent tabular entries, in descending order, show that a preview range is set to "full", a waveform value is defined, as depicted by an arrow 1116, by the data structure 1120 for waveform control, and the tabular entry 1142 contains graphical information specific to generation of the display, such as a colour of the display.

FIG. 10 thus describes data structures and their interrelationships for the coupled controls of interest namely frequency control and waveform control. From a user perspective, a "logarithmic type" slider control (associated with the data structure 1102) and a "selector type" waveform control (associated with the data structure 1120) are coupled by the user. The user is interested in obtaining a preview of the effect that variation in the frequency control has on a current waveform, which is defined by the settings of the waveform control, which is in turn associated with the data structure 1120. Contextual information is drawn from the data structure 1120 in order to define the waveform whose frequency is to be varied by the frequency control which is associated with the data structure 1102. It is the operation of the frequency control associated with the data structure 1102 which to be previewed by the user.

Figure 11A:
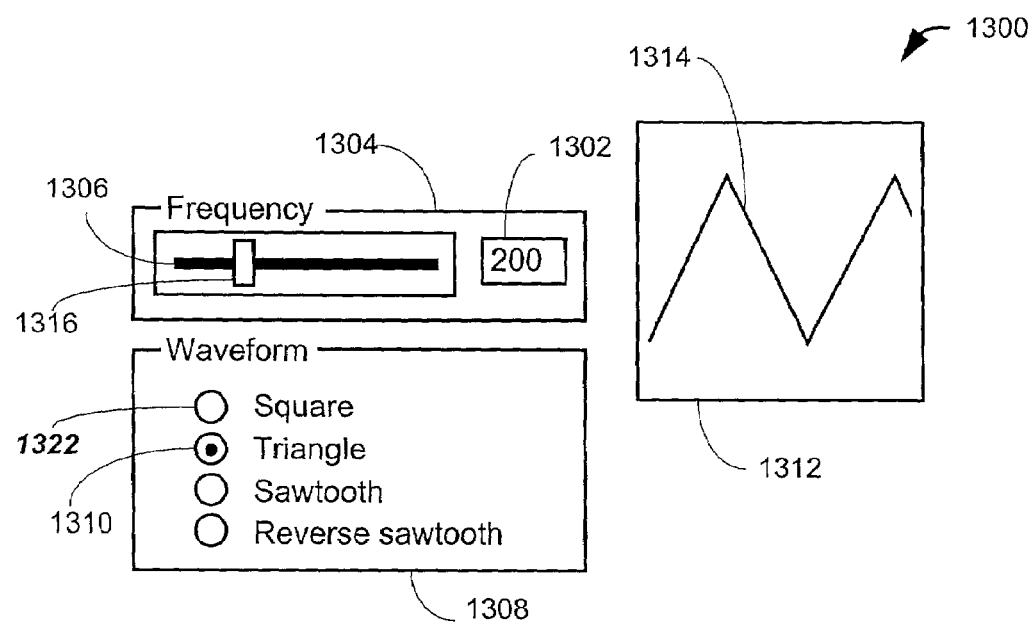
FIGS. 11A and 11B depict a graphical user interface for the coupled controls of FIG. 10.
Figure 11B:
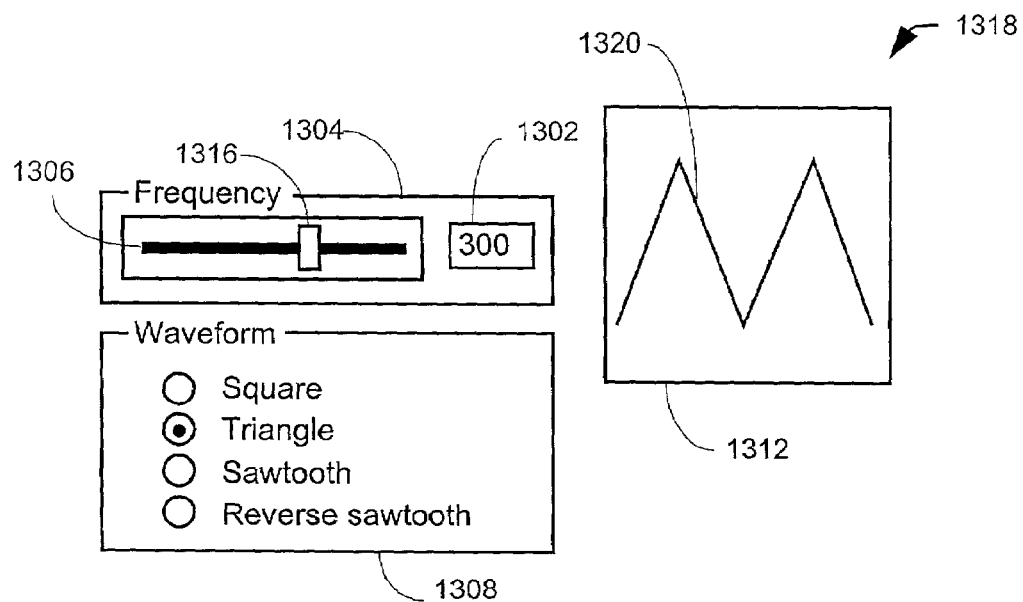

FIGS. 11A and 11B depict a graphical user interface 1300 for the coupled frequency and waveform controls described in relation to FIG. 10 in which the user wishes to preview a triangular waveform with varying frequency. FIG. 11A shows a frequency control 1304 in the form of a logarithmic slider 1316 which is adjustable along a range-slot 1306. A position of the slider 1316 is reflected in a frequency window 1302 which displays an associated frequency value "200" . Below the frequency control 1304 is a waveform selector-type control 1308 for selecting one of four possible wave form options. The available waveforms are, commencing from an upper-most wave form 1322, a square wave, a triangle wave, a saw tooth wave, and a reverse saw tooth wave. FIG. 11A show that a triangle wave has been selected, this being indicated by a solid black circle in the center of a selector ring 1310. The frequency control 1304 and the waveform control 1308 are coupled as previously described in relation to FIG. 10, and accordingly an associated pop-up preview display 1213 depicts a triangular wave form 1314 with a frequency of "200" .

FIG. 11B shows an updated depiction 1318 of the coupled frequency control 1304 and the coupled waveform control 1308 in which the frequency slider 1316 has been adjusted by the user in a right-ward direction along the range slot 1306. This adjustment has resulted in an increase of the selected frequency value to "300", as depicted in the frequency range window 1302. The waveform selection control is still fixed as being a triangle, as indicated in the waveform selection control 1308. The effect of adjusting the frequency control 1304 as indicated is reflected by the fact that the triangular waveform 1320 shown in the pop-up preview display 1312 has a higher frequency (by a ratio of 300:200) with respect to the previous triangular waveform 1314 shown in the first depiction 1300.

Figure 12:
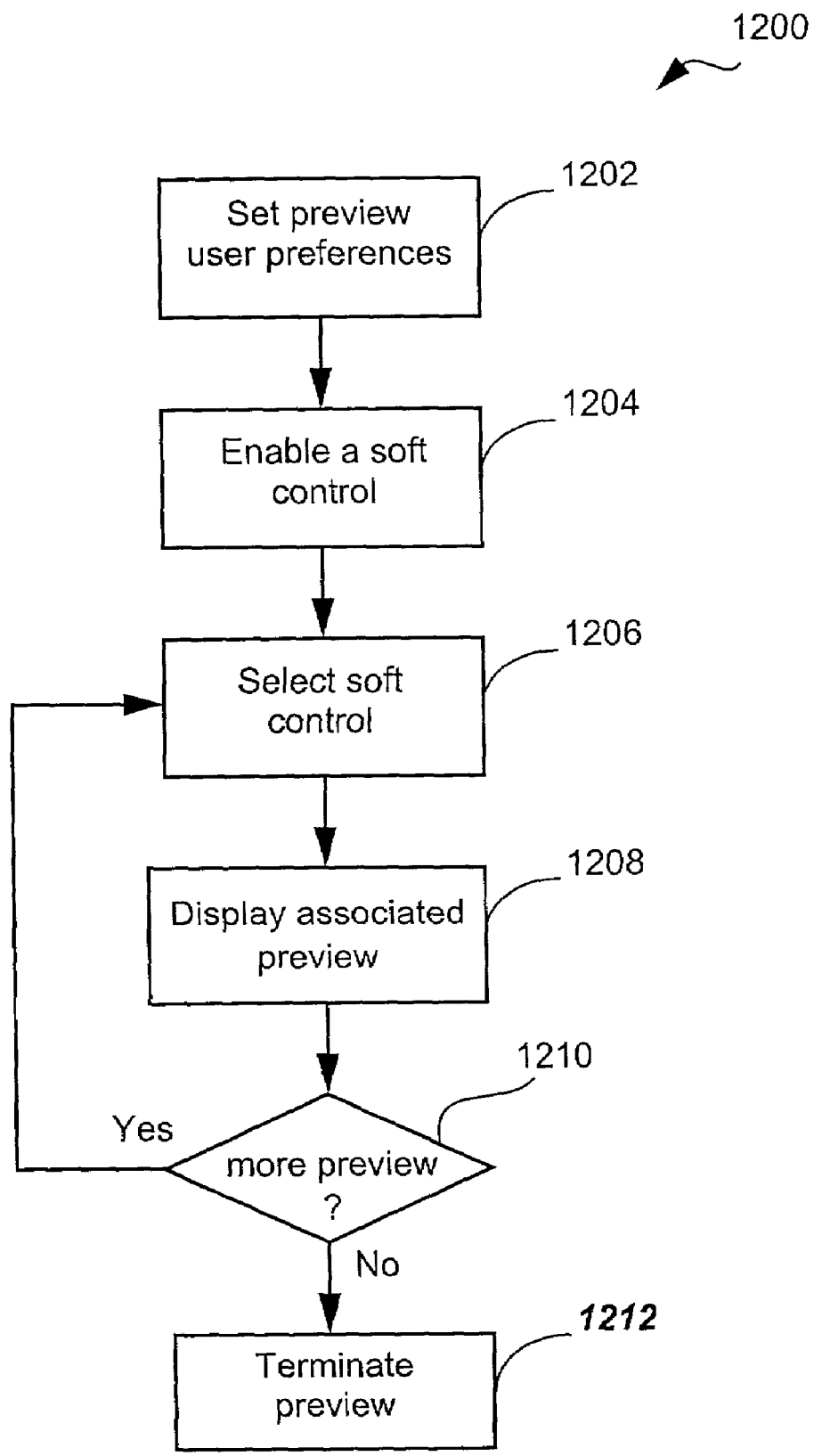
FIG. 12 shows a method of providing active user feedback in accordance with described arrangements.

FIG. 12 shows a method 1200 of providing active user feedback in a graphic user interface, in accordance with described arrangements. In a first step 1202, a user sets user preferences, after which, in a subsequent step 1204, the user enables the particular soft control(s) desired to be used, as described in more detail in relation to FIG. 9. Thereafter, in a step 1206, the user selects the desired soft control whose operation is to be previewed. The selection, or designation, of the control is either active as described in relation to FIG. 3, or passive as described in relation to FIG. 6. In a following step 1208, the preview is displayed in accordance with the user preferences which were set in the step 1202. The user is able, via a decision step 1210, to elect to continue the preview, in which event the method 1200 is directed in accordance with a "yes" arrow back to the block 1206, thereby maintaining the selection of the soft control, and thereby, maintaining the preview. Alternately, if the user wishes to terminate the preview, then the method 1200 is directed in accordance with a "no" arrow to a preview termination step 1212, inferring that the user terminates selection of the control.

Figure 13:
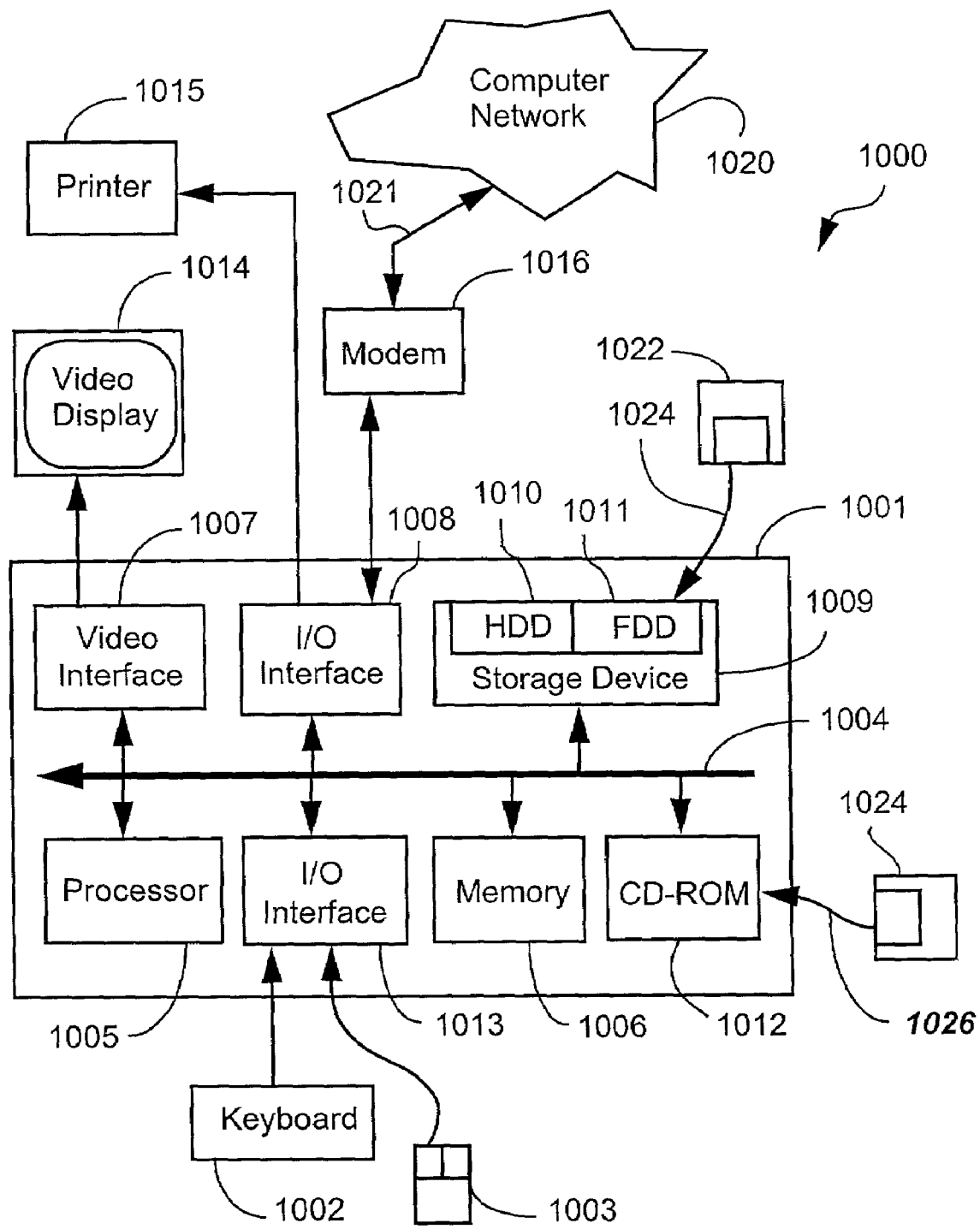
FIG. 13 is a schematic block diagram of a general purpose computer upon which disclosed arrangements can be practiced.

The method of providing active user feedback in a graphic user interface is preferably practiced using a conventional general-purpose computer system 1000, such as that shown in FIG. 13 wherein the processes related to FIGS. 2 to 9 may be implemented as software, such as an application program executing within the computer system 1000. In particular, the steps of method of providing active user feedback in a graphic user interface are effected by instructions in the software that are carried out by the computer. The software may be divided into two separate parts, one part for carrying out the providing of active user feedback in a graphic user interface, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for providing active user feedback in a graphic user interface in accordance with the disclosed arrangements.

The computer system 1000 comprises a computer module 1001, input devices such as a keyboard 1002 and mouse 1003, output devices including a printer 1015 and a display device 1014. A Modulator-Demodulator (Modem) transceiver device 1016 is used by the computer module 1001 for communicating to and from a communications network 1020, for example connectable via a telephone line 1021 or other functional medium. The modem 1016 can be used to obtain access to the Internet, and other network systems, such as a Local Area Network (LAN) or a Wide Area Network (WAN).

The computer module 1001 typically includes at least one processor unit 1005, a memory unit 1006, for example formed from semiconductor random access memory (RAM) and read only memory (ROM), input/output (I/O) interfaces including a video interface 1007, and an I/O interface 1013 for the keyboard 1002 and mouse 1003 and optionally a joystick (not illustrated), and an interface 1008 for the modem 1016. A storage device 1009 is provided and typically includes a hard disk drive 1010 and a floppy disk drive 1011, which is able to receive, as depicted by an arrow 1024, a floppy disk 1022. A magnetic tape drive (not illustrated) may also be used. A CD-ROM drive 1012 is typically provided as a non-volatile source of data, this drive 1012 being able to receive, as depicted by an arrow 1026, a CD-ROM 1024. The components 1005 to 1013 of the computer module 1001, typically communicate via an interconnected bus 1004 and in a manner which results in a conventional mode of operation of the computer system 1000 known to those in the relevant art. Examples of computers on which the disclosed arrangements can be practised include IBM-PCs and compatibles, Sun Sparcstations or alike computer systems evolved therefrom.

Typically, the application program of the disclosed arrangement is resident on the hard disk drive 1010 and read and controlled in its execution by the processor 1005. Intermediate storage of the program and any data fetched from the network 1020 may be accomplished using the semiconductor memory 1006, possibly in concert with the hard disk drive 1010. In some instances, the application program may be supplied to the user encoded on a CD-ROM or floppy disk and read via the corresponding drive 1012 or 1011, or alternatively may be read by the user from the network 1020 via the modem device 1016. Still further, the software can also be loaded into the computer system 1000 from other computer readable medium including magnetic tape, a ROM or integrated circuit, a magneto-optical disk, a radio or infra-red transmission channel between the computer module 1001 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of providing active user feedback in a graphic user interface may alternatively be implemented in dedicated hardware such as one or more integrated circuits performing the functions or sub functions of providing active user feedback in a graphic user interface. Such dedicated hardware may include graphic processors, digital signal processors, or one or more microprocessors and associated memories.

INDUSTRIAL APPLICABILITY

It is apparent from the above that the embodiments of the invention are applicable to the computer and data processing industries.

The foregoing describes only some embodiments of the present invention, and modifications and/or changes can be made thereto without departing from the scope and spirit of the invention, the embodiments being illustrative and not restrictive.

The invention claimed is:

1. A method of providing active user feedback in a graphic user interface including an adjustable soft control able to change an attribute of an object over a continuous range of attribute values, said method comprising steps of:
   detecting positioning of a pointing device over the soft control, said positioning designating the soft control;
   displaying a window upon designation of the soft control;
   displaying a representation of the object in the window; and
   animating the displayed representation of the object to mimic an effect on the attribute of a nominal adjustment of the soft control, said animation being presented in the window as a training preview exemplifying the nature of change in said attribute that can be expected to arise from adjustment of the soft control.

2. A method according to claim 1, wherein the animating step mimics an effect on the attribute by varying a corresponding attribute of the displayed representation over a part of the range of attribute values.

3. A method according to claim 1, wherein said preview window is superimposed on a display area of said graphic user interface.

4. A method according to claim 1, wherein the representation of the object is a symbolic object whose shape is adapted to reflect a change in the value of said attribute corresponding to said nominal adjustment.

5. A method according to claim 1, wherein said step of displaying a window is capable of being one of enabled and inhibited.

6. A method according to claim 1, wherein:
   the method comprises a step of displaying a representation of the adjustable soft control; and:
   the animating step further comprises showing, in ghost form in the window, said nominal adjustment of the soft control corresponding to the animation of the displayed representation of the object.

7. A method according to claim 1, wherein the preview window can be customized by defining user preferences.

8. A method according to claim 7, wherein the customization comprises at least one of:
setting a nature of the change, and
setting a range of the change.

9. A method according to claim 1, further comprising the step of coupling another soft control to said soft control, wherein the change implementable by the soft control is dependent upon a current setting of the other soft control.

10. A method according to claim 1, comprising the further steps of:
adjusting the soft control in a continuous temporal manner; and
animating the displayed representation of the object in response to the adjusting step, said animation being presented in the window as a preview exemplifying the effect of change in said attribute that can be expected to arise from said adjusting of the soft control.

11. A method according to claim 10, comprising the further steps of:
releasing the designation of the soft control; and
changing a display of the object in a display area of the graphical user interface in response to the releasing of the soft control.

12. A computer readable medium storing a computer program for providing active user feedback in a graphic user interface including an adjustable soft control able to change an attribute of an object over a continuous range of attribute values, said program comprising:
code for detecting positioning of a pointing device over the soft control, said positioning designating the soft control;
code for displaying a window upon designation of the soft control;
code for displaying a representation of the object in the window; and
code for animating the displayed representation of the object to mimic an effect on the attribute of a nominal adjustment of the soft control, said animation being presented in the window as a training preview exemplifying the nature of change in said attribute that can be expected to arise from adjustment of the soft control.

13. A medium according to claim 12, wherein said code for animating mimics an effect on the attribute by varying a corresponding attribute of the displayed representation over a part of the range of attribute values.

14. A medium according to claim 12, wherein said preview window is superimposed on a display area of said graphic user interface.

15. A medium according to claim 12, wherein the representation of the object is a symbolic object whose shape is adapted to reflect a change in the value of said attribute corresponding to said nominal adjustment.

16. A medium according to claim 12, wherein the representation of the object is a literal representation of the object whose shape is adapted to reflect a change in the value of the attribute corresponding to said nominal adjustment.

17. A medium according to claim 12, wherein said code for displaying a window is capable of being one of enabled and inhibited.

18. A medium according to claim 12, further comprising:
code for displaying a representation of the adjustable soft control; and wherein the code for the animating step further comprises:
code for showing, in ghost form in the window, said nominal adjustment of the soft control corresponding to the animation of the displayed representation of the object.

19. A medium according to claim 12, wherein the preview window can be customized by defining user preferences.

20. A medium according to claim 19, wherein the customization comprises at least one of:
setting a nature of the change; and
setting a range of the change.

21. A medium according to claim 12, further comprising the code for a coupling step for coupling another soft control to said soft control, wherein the change implementable by the soft control is dependent upon a current setting of the other soft control.

22. A computer readable medium according to claim 12, further comprising:
code for adjusting the soft control in a continuous temporal manner; and
code for animating the displayed representation of the object in response to the adjusting step, said animation being presented in the window as a preview exemplifying the effect of change in said attribute that can be expected to arise from said adjusting of the soft control.

23. A computer readable medium according to claim 22, further comprising:
code for releasing the designation of the soft control; and
code for changing a display of the object in a display area of the graphical user interface in response to the releasing of the soft control.

24. An apparatus for providing active user feedback in a graphic user interface including an adjustable soft control able to change an attribute of an object over a continuous range of attribute values, said apparatus comprising:
a screen counter detection controller for controlling detecting positioning of a pointing device over the soft control, said positioning designating the soft control;
a window display controller for controlling displaying a window upon designation of the soft control;
an object representation display controller for controlling displaying a representation of the object in the window; and
a display animation controller for controlling animating the displayed representation of the object to mimic an effect on the attribute of a nominal adjustment of the soft control, said animation being presented in the window as a training preview exemplifying the nature of change in said attribute that can be expected to arise from adjustment of the soft control.

25. An apparatus according to claim 24, further comprising:
a designating release controller for controlling releasing the designation of the soft control; and
an object display controller for controlling changing a display of the object in a display area of the graphical user interface in response to the releasing of the soft control.

* * * * *

UNITED STATES PATENT AND TRADEMARK OFFICE
CERTIFICATE OF CORRECTION

PATENT NO. : 7,111,239 B2
APPLICATION NO. : 09/867631
DATED : September 19, 2006
INVENTOR(S) : Timothy Mark Morris-Yates It is certified that error appears in the above-identified patent and that said Letters Patent is hereby corrected as shown below:

ON COVER PAGE AT (56) TITLE OF THE INVENTION

"METHOD FOR ACTIVE FEEDBACK" should read --METHOD FOR ACTIVE USER FEEDBACK--.

COLUMN 1

Line 1, "METHOD FOR ACTIVE FEEDBACK" should read --METHOD FOR ACTIVE USER FEEDBACK--.

COLUMN 4

Line 58, "Three discs 314 to 318" should read --Three discs 314, 316, 318--.

COLUMN 5

Line 28, "objects" should read --object--.

COLUMN 10

Line 31, "controls" should read --controls,--.

COLUMN 11

Line 12, "represent" should read --represents--.

UNITED STATES PATENT AND TRADEMARK OFFICE
CERTIFICATE OF CORRECTION

| | | |
|---|---|---|
| PATENT NO. | : 7,111,239 B2 | |
| APPLICATION NO. | : 09/867631 | |
| DATED | : September 19, 2006 | |
| INVENTOR(S) | : Timothy Mark Morris-Yates | |

It is certified that error appears in the above-identified patent and that said Letters Patent is hereby corrected as shown below:

<u>COLUMN 12</u>

Line 11, "to be" should read --is to be--.

Signed and Sealed this

Eighth Day of May, 2007

JON W. DUDAS
*Director of the United States Patent and Trademark Office*